US011166506B2

(12) United States Patent
Roberson

(10) Patent No.: US 11,166,506 B2
(45) Date of Patent: *Nov. 9, 2021

(54) HANDS-FREE UTILITY BELT

(71) Applicant: Paul Roberson, North Las Vegas, NV (US)

(72) Inventor: Paul Roberson, North Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,504

(22) Filed: Feb. 4, 2019

(65) Prior Publication Data

US 2020/0000164 A1    Jan. 2, 2020

Related U.S. Application Data

(63) Continuation of application No. 15/808,744, filed on Nov. 9, 2017, now Pat. No. 10,231,500, which is a
(Continued)

(51) Int. Cl.
*A41F 9/02* (2006.01)
*A01K 1/06* (2006.01)
(Continued)

(52) U.S. Cl.
CPC .............. *A41F 9/025* (2013.01); *A01K 1/06* (2013.01); *A01K 27/00* (2013.01); *A41F 9/002* (2013.01)

(58) Field of Classification Search
CPC .. A41F 9/002; A41F 9/02; A41F 9/025; A41F 9/00; A01K 27/00; A01K 27/001;
(Continued)

(56) References Cited

U.S. PATENT DOCUMENTS 1,994,097 A    3/1935  Esau
1,995,783 A    3/1935  Svoren
(Continued)

FOREIGN PATENT DOCUMENTS

CA         2582245 A1    10/2008
DE        10214640 A1    10/2003
DE     202015100197 U1     1/2015

OTHER PUBLICATIONS

Jeremy Anderson et al., Hands-Free Dog Leash, Acme Design Group Final Report ME4182, Mar. 9, 1998, http://helix.gatech.edu/Classes/ME4182/1998Q1/webs/adg/memos/final.html.
(Continued)

*Primary Examiner* — Amy Vanatta
(74) *Attorney, Agent, or Firm* — Howard & Howard Attorneys PLLC

(57) ABSTRACT

A utility belt is disclosed. The utility belt comprises a belt track, a ball bearing assembly, and an extender assembly. The belt track includes a first belt section having a first male locking mechanism and a first female locking mechanism, and a second belt section having a second male locking mechanism and a second female locking mechanism. The first male locking mechanism connects to the second female locking mechanism. The second male locking mechanism connects to the first female locking mechanism. The first belt section and the second belt section each comprises an outer sheath and an inner tube. The inner tube includes a plurality of C-shaped rings. The ball bearing assembly has a ball bearing and a joint. The ball bearing rotates about the belt track. An extender assembly is coupled to the belt track and includes at least one connector and at least one spacer.

18 Claims, 14 Drawing Sheets

Related U.S. Application Data continuation of application No. 15/414,495, filed on Jan. 24, 2017, now Pat. No. 9,839,248.

(51) Int. Cl.
*A01K 27/00* (2006.01)
*A41F 9/00* (2006.01)

(58) Field of Classification Search
CPC .......... A01K 27/005; A01K 1/06; A01K 1/04; A01K 27/003; A47D 13/086; F16C 29/045; F16C 29/005; F16C 29/002; F16C 2314/00; F16C 19/00; F16C 19/50; F16C 29/04; F16C 29/004; F16C 29/06; F16C 29/0604; F16C 31/04; F16C 31/06; A63H 18/02; A63B 19/00
USPC ............ 2/338; 119/770, 785, 857, 792, 295; 446/28
See application file for complete search history.

(56) References Cited

U.S. PATENT DOCUMENTS

| | | | |
|---|---|---|---|
| 2,194,734 A | 3/1940 | Brenner | |
| 2,356,715 A | 8/1944 | Webster | |
| 2,725,853 A | 12/1955 | Nordheim | |
| 3,004,519 A | 10/1961 | Weissman | |
| 3,721,216 A | 3/1973 | Lippe et al. | |
| 3,868,786 A | 3/1975 | Lippe et al. | |
| 4,151,936 A | 5/1979 | Hawkes | |
| 4,860,560 A | 8/1989 | Lundelius | |
| 4,915,666 A | 4/1990 | Maleyko | |
| 4,977,860 A | 12/1990 | Harwell | |
| 5,080,045 A | 1/1992 | Reese et al. | |
| 5,136,858 A | 8/1992 | Bruner | |
| 5,161,486 A | 11/1992 | Brown | |
| 5,718,189 A | 2/1998 | Blake | |
| 5,842,444 A | 12/1998 | Perrulli | |
| 6,217,482 B1 | 4/2001 | Yoo et al. | |
| 6,450,129 B1 | 9/2002 | Flynn | |
| 6,520,290 B1 | 2/2003 | Carter | |
| 6,837,188 B1 | 1/2005 | Martin | |
| 7,467,604 B1 | 12/2008 | Werner et al. | |
| D610,751 S | 2/2010 | Kokmeyer | |
| 7,814,866 B1 | 10/2010 | Gramza | |
| 7,992,506 B1 | 8/2011 | Patton et al. | |
| 8,342,137 B1 | 1/2013 | Burkhardt | |
| 8,622,028 B2 | 1/2014 | Ekstrum | |
| 8,919,292 B1 | 12/2014 | Wang et al. | |
| 2004/0194733 A1 | 10/2004 | Bremm | |
| 2005/0117989 A1 | 6/2005 | Ewles | |
| 2009/0044763 A1 | 2/2009 | Russo et al. | |
| 2010/0024742 A1 | 2/2010 | Honeycutt et al. | |
| 2010/0089338 A1* | 4/2010 | Stern .................... | A47D 13/086 119/770 |
| 2013/0042818 A1 | 2/2013 | Capoano | |
| 2013/0042819 A1 | 2/2013 | Ekstrum | |
| 2014/0115756 A1 | 5/2014 | Anderson | |
| 2015/0013619 A1 | 1/2015 | Kahana, Jr. | |
| 2015/0075448 A1 | 3/2015 | Clark et al. | |
| 2016/0324125 A1* | 11/2016 | Jasmine, Sr. ......... | A01K 27/001 |

OTHER PUBLICATIONS

Squishy Face Studio, Leash Belt, http://www.squishyfacestudio.com/leash-belt-3/.
International Search Report and Written Opinion (PCT/US18/14891); dated Feb. 18, 2018.

* cited by examiner

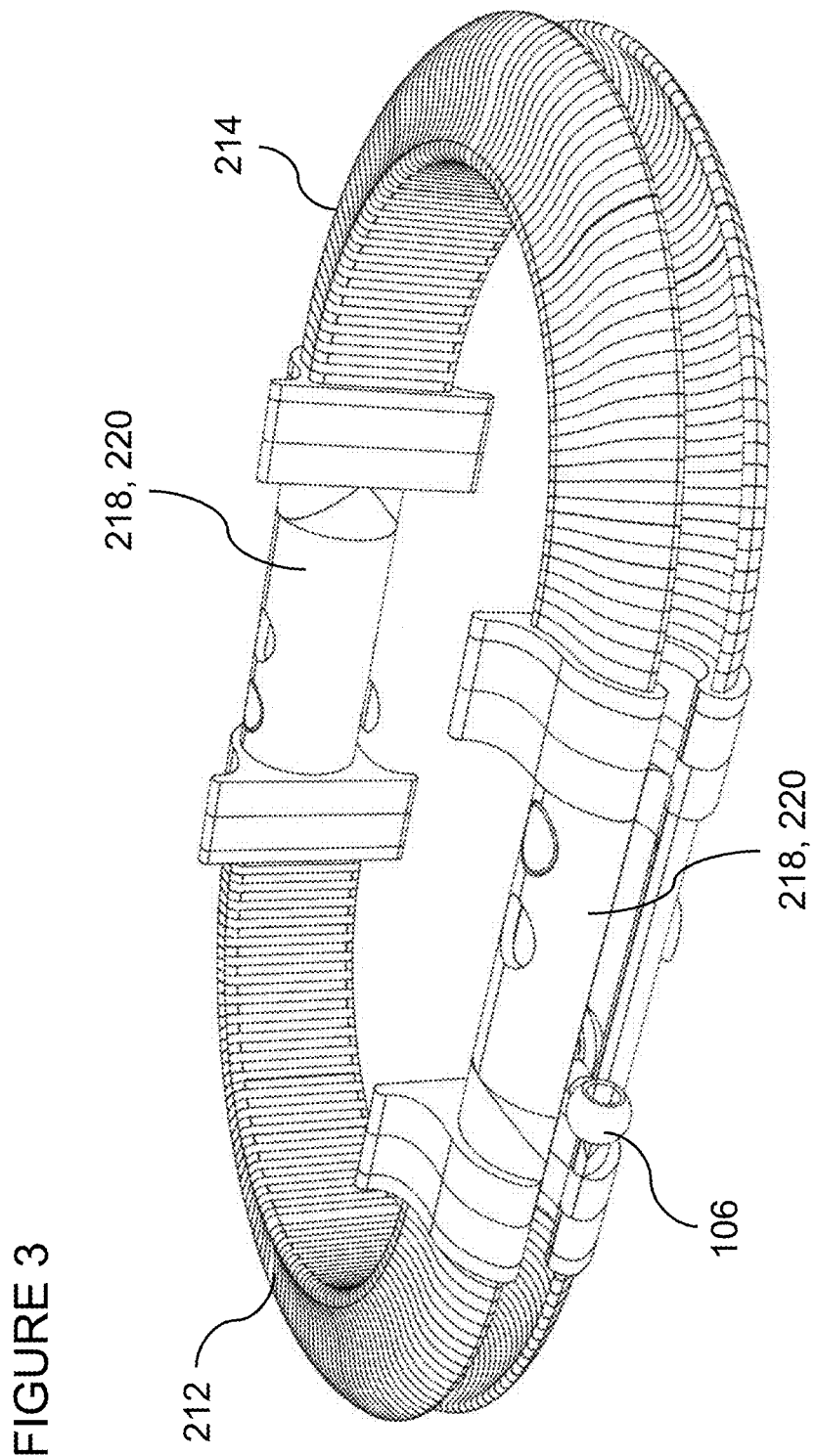

HANDS-FREE UTILITY BELT

CROSS REFERENCE TO RELATED APPLICATION

This application is a continuation of U.S. patent application Ser. No. 15/808,744, filed Nov. 9, 2017, which claims the benefit of U.S. patent application Ser. No. 15/414,495, filed Jan. 24, 2017 (now U.S. Pat. No. 9,839,248, issued Dec. 12, 2017), the disclosures of which are hereby incorporated by reference in their entirety for all purposes.

TECHNICAL FIELD

The present invention generally concerns utility belts. More particularly, the present invention relates to a hands-free utility belt.

BACKGROUND OF THE INVENTION

Utility belts and leashes may be used to connect a user to something else, which could be stationary (e.g., a wall or floor, such as for safety during a construction project or extreme sports), or non-stationary (e.g., another person during extreme sports or athletic training, or a pet or child for safety and control). However, existing utility belts and leashes are bulky and severely limit the user's range of motion. Many such belts or leashes are one-dimensional and lack functionality and efficiency, which results in frustration and inconvenience, wasted time, decreased safety and control. Examples of leash systems include fabric leashes attached to belts using clip systems. Although "hands-free", these designs do not offer 360-degree rotation of the leash around the user's waist. As such, the user's range of motion continues to be limited. Moreover, when used to walk a dog while the user walks or runs, these designs may be dangerous if the dog suddenly stops or moves from one side of the user to the other. If more than one dog leash is attached to the belt, the leashes can become tangled. Because the leash does not rotate around the belt, any such movement may pull the user off-balance and cause the user to trip, fall, or be moved into the path of traffic or other dangerous situation.

Previous attempts to improve such systems include the invention disclosed in U.S. Pat. Pub. No. 2015/0013619 entitled "Pet Leash Belt Device", by Robert J. Kahana, Jr., which discloses a fabric belt worn by pet owners and features a sliding ring mechanism on which the wearer secures a standard pet leash. Although this design improves functionality by allowing increased range of motion, it lacks customization, durability and strength, and versatility for use in applications other than as a pet leash.

The present invention is aimed at one or more of the problems identified above.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 illustrates a perspective view of an assembled and locked utility belt system of FIG. 2B;

Corresponding reference characters indicate corresponding parts throughout the drawings.

SUMMARY OF THE INVENTION

Figure 1:
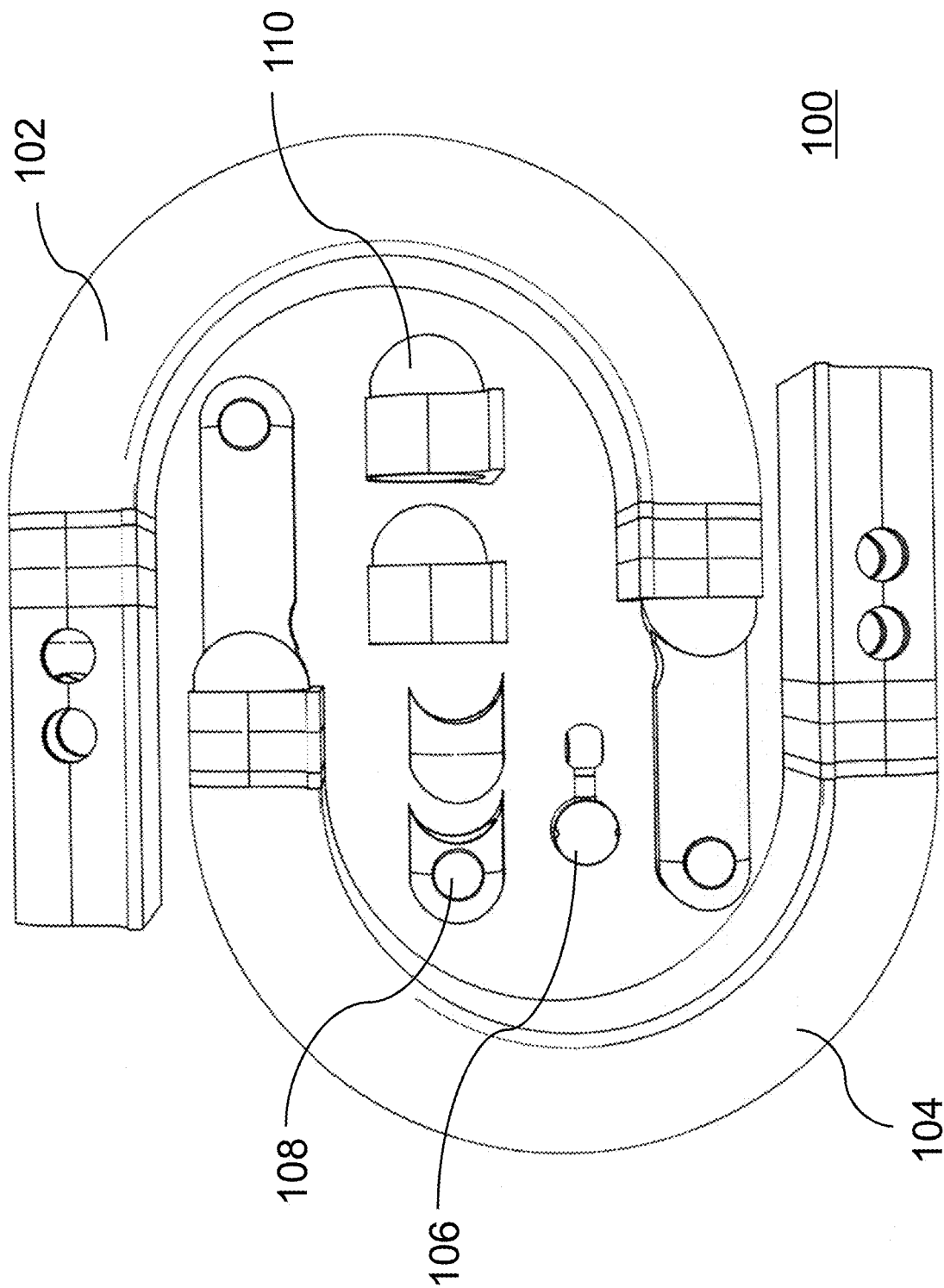
FIG. 1 illustrates an exploded view of an exemplary utility belt system.

According to one embodiment of the present invention, a utility belt comprises a belt track including a first belt section coupled to a second belt section by a locking mechanism. The utility belt further comprises a ball bearing assembly having a ball bearing and a joint. The ball bearing rotates about the belt track.

According to another embodiment of the present invention, a utility belt comprises a belt track and a ball bearing assembly. The belt track includes a first belt section having a first male locking mechanism and a first female locking mechanism. The belt track further includes a second belt section coupled to the first belt section having a second male locking mechanism and a second female locking mechanism. The first male locking mechanism connects to the second female locking mechanism. The second male locking mechanism connects to the first female locking mechanism. The ball bearing assembly has a ball bearing and a joint. The ball bearing rotates about the belt track.

According to yet another embodiment of the present invention, a utility belt comprises a belt track, a ball bearing assembly, and an extender assembly. The belt track includes a first belt section having a first male locking mechanism and a first female locking mechanism. The belt track further includes a second belt section having a second male locking mechanism and a second female locking mechanism. The first and second male locking mechanisms each includes a top lock button and a bottom lock button. The first and second female locking mechanisms each includes a plurality of top apertures and a plurality of bottom apertures. The first male locking mechanism connects to the second female locking mechanism when the top lock button of the first male locking mechanism protrudes through one of the plurality of top apertures of the second female locking mechanism, and the bottom lock button of the first male locking mechanism protrudes through one of the plurality of bottom apertures of the second female locking mechanism. The second male locking mechanism connects to the first female locking mechanism when the top lock button of the second male locking mechanism protrudes through one of the plurality of top apertures of the first female locking mechanism, and the bottom lock button of the second male locking mechanism protrudes through one of the plurality of bottom apertures of the first female locking mechanism. The first belt section and the second belt section each comprises an outer sheath and an inner tube. The inner tube including a plurality of C-shaped rings. The ball bearing assembly has a ball bearing and a joint. The ball bearing rotates about the belt track. An extender assembly is coupled to the belt track and includes at least one connector and at least one spacer.

DETAILED DESCRIPTION OF THE INVENTION

With reference to the drawings and in operation, the present invention overcomes at least some of the disadvantages of known utility belts. Persons of ordinary skill in the art will realize that the following description of the presently invention is illustrative only and not in any way limiting. Other embodiments of the invention will readily suggest themselves to such skilled persons.

Referring now to FIG. 1, an exploded view of an exemplary utility belt system is shown. A utility belt system 100 includes a first belt section 102 and a second belt section 104. Although the exemplary utility belt system 100 includes two sections, it is contemplated that any number of sections could be used to achieve the desired amount of flexibility and comfort of utility belt system 100. Utility belt system 100 may additionally include a ball bearing and joint 106. Optionally, an extender assembly comprised of connectors 108 and spacers 110 may be used (see also FIGS. 6-7).

Figure 2A:
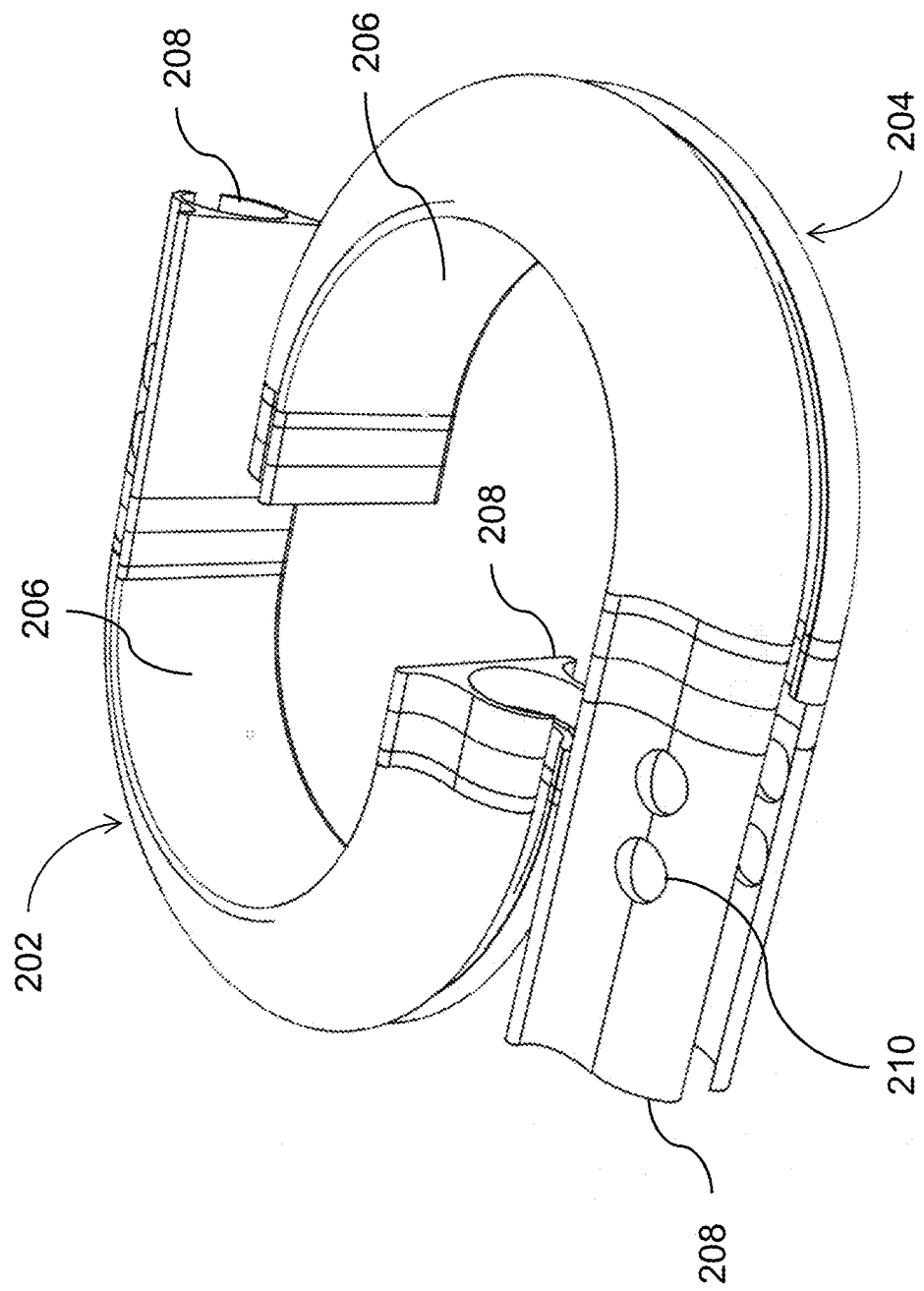
FIG. 2A illustrates a perspective view of an outer sheath of the utility belt system of FIG. 1.

Referring now to FIG. 2A, a perspective view of an outer sheath of the utility belt system of FIG. 1 is shown. First belt section 102 of FIG. 1 corresponds to an outer sheath 202, and second belt section 104 of FIG. 1 corresponds to an outer sheath 204. Outer sheaths 202, 204 each include a rigid, flat backbone 206 connected to a flexible C-shaped track 208. Outer sheaths 202, 204 may be comprised of any sturdy yet flexible material, including, for example, polyvinyl chloride (PVC) or other synthetic plastic polymers. Outer sheaths 202, 204 each further include a plurality of sheath apertures, one of which is labeled 210. In the exemplary embodiment, each outer sheath 202, 204 includes four sheath apertures 210, but it is contemplated that any number of sheath apertures 210 may be included on each outer sheath 202, 204. In some embodiments, outer sheaths 202, 204 may be covered in an additional sleeve (not shown) comprised of another material, including by way of example and not limitation, nylon to provide enhanced comfort for the user.

Figure 2B:
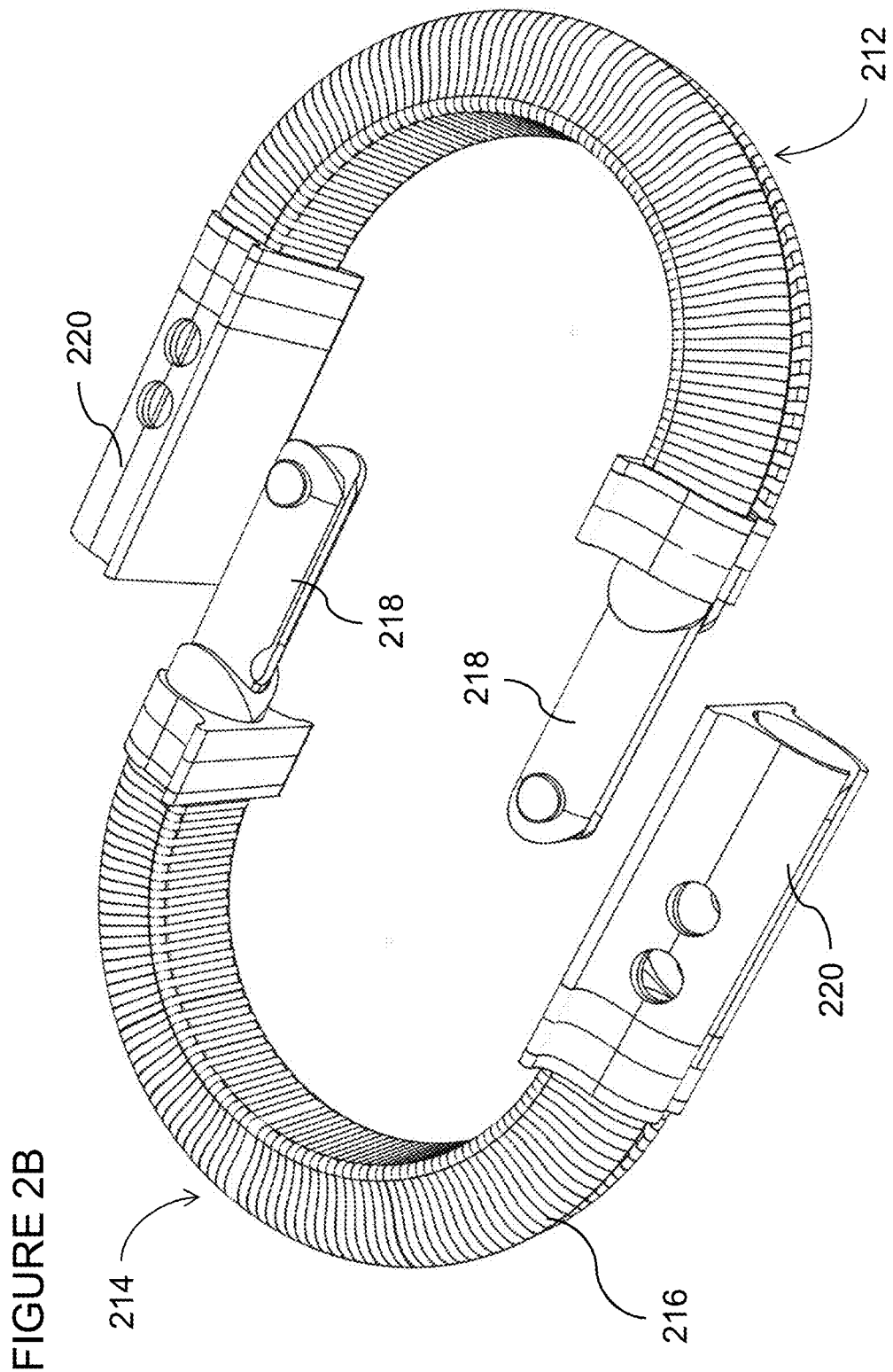
FIG. 2B illustrates a perspective view of an inner C-ring tube of the utility belt system of FIG. 1.

Referring now to FIG. 2B, a perspective view of inner C-ring tubes of the utility belt system 100 of FIG. 1 is shown. First belt section 102 of FIG. 1 corresponds to an inner C-ring tube 212, and second belt section 104 of FIG. 1 corresponds to an inner C-ring tube 214. Inner C-ring tubes 212, 214 each include a plurality of flexible C-shaped rings, one of which is labeled 216. Flexible C-shaped rings 216 may be comprised of any rigid material, for example aluminum or stainless steel. The space between the C-shaped rings 216 may be filled with a durable and flexible material, such as but not limited to NinjaFlex® by NinjaTek®, which flexible material acts as a cartilage-like material to support the C-shaped rings 216 while providing maximum flexibility. The filler material may be added by injection molding or a similar technique. Each of inner C-ring tubes 212, 214 further includes a male locking mechanism 218 and a female locking mechanism 220.

Figure 2C:
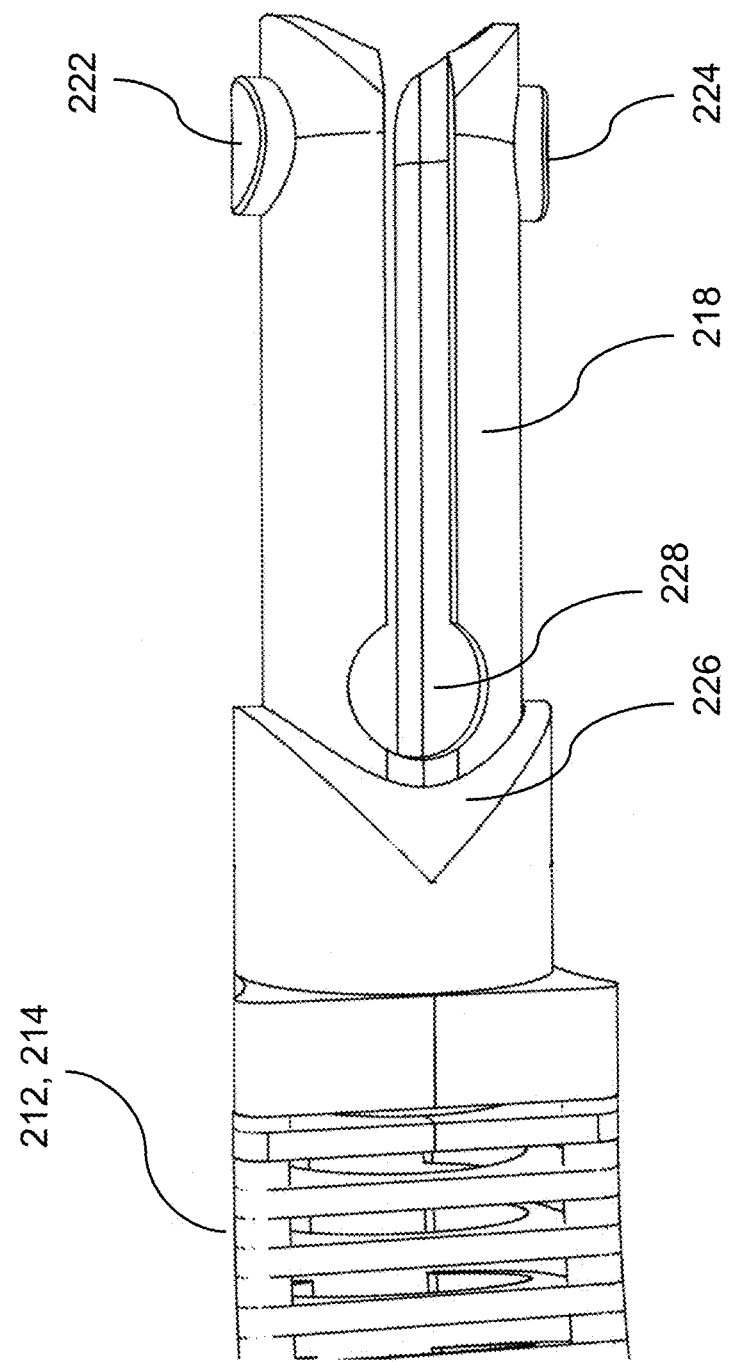
FIG. 2C illustrates a partial side view of a male locking mechanism of the inner C-ring tube of FIG. 2B.

Referring now to FIG. 2C, a partial side view of a male locking mechanism of the inner C-ring tubes 212, 214 of FIG. 2B is shown. Male locking mechanism 218 includes a protruding top lock button 222 and a protruding bottom lock button 224. Male locking mechanism 218 is connected to an inner C-ring tube 212, 214 by way of a male connector 226. Male locking mechanism 218 further includes a circular cut-out 228.

Figure 2D:
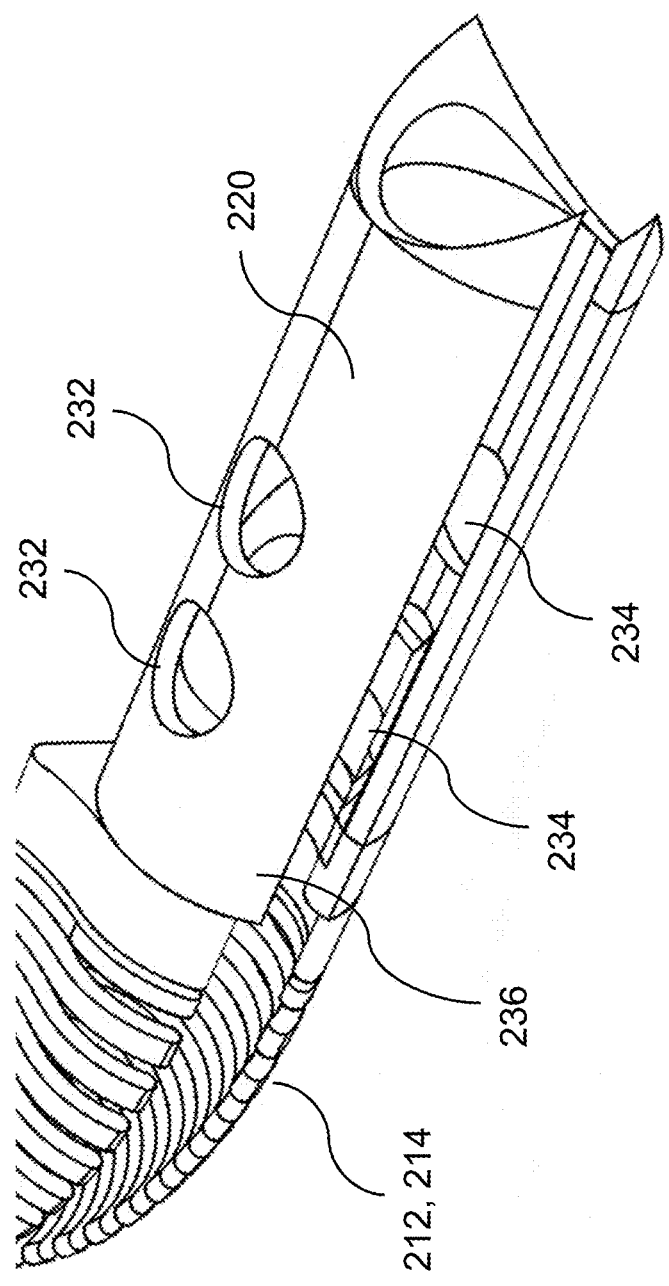
FIG. 2D illustrates a partial perspective view of a female locking mechanism of the inner C-ring tube of FIG. 2B.

Referring now to FIG. 2D, a partial perspective view of a female locking mechanism of the inner C-ring tubes 212, 214 of FIG. 2B is shown. Female locking mechanism 220 includes a plurality of top apertures 232 and a plurality of bottom apertures 234. In the exemplary embodiment, two top apertures 232 and two bottom apertures 234 are shown, although it is contemplated that female locking mechanism 220 may include any number of top apertures 232 and any number of bottom apertures 234. Female locking mechanism 220 is connected to an inner C-ring tube 212, 214 by way of a female connector 236.

Referring now to FIG. 3, a perspective view of an assembled and locked utility belt system of FIG. 2B is shown. Outer sheaths 202, 204 cover inner C-ring tubes 212, 214 and female locking mechanisms 220, such that sheath apertures 210 align with top apertures 232 and bottom apertures 234. When male locking mechanism 218 is inserted into female locking mechanism 220, the top lock button 222 and bottom lock button 224 interface with apertures 232, 234. The circular cut-out 228 (see FIG. 2C) causes the male locking mechanism 218 to act as a spring. Circular cut-out 228 (see FIG. 2C) forces the upper and lower portions of male locking mechanism 218 in an outward direction in order to retain its circular shape, thereby forcing top lock button 222 and bottom lock button 224 through apertures 232, 234. This action places the utility belt system in a locked position. Moreover, the semicircular shape of the edges of inner C-ring tubes 212, 214 prevents torsional rotation when the belt is in a locked position.

Figure 4A:
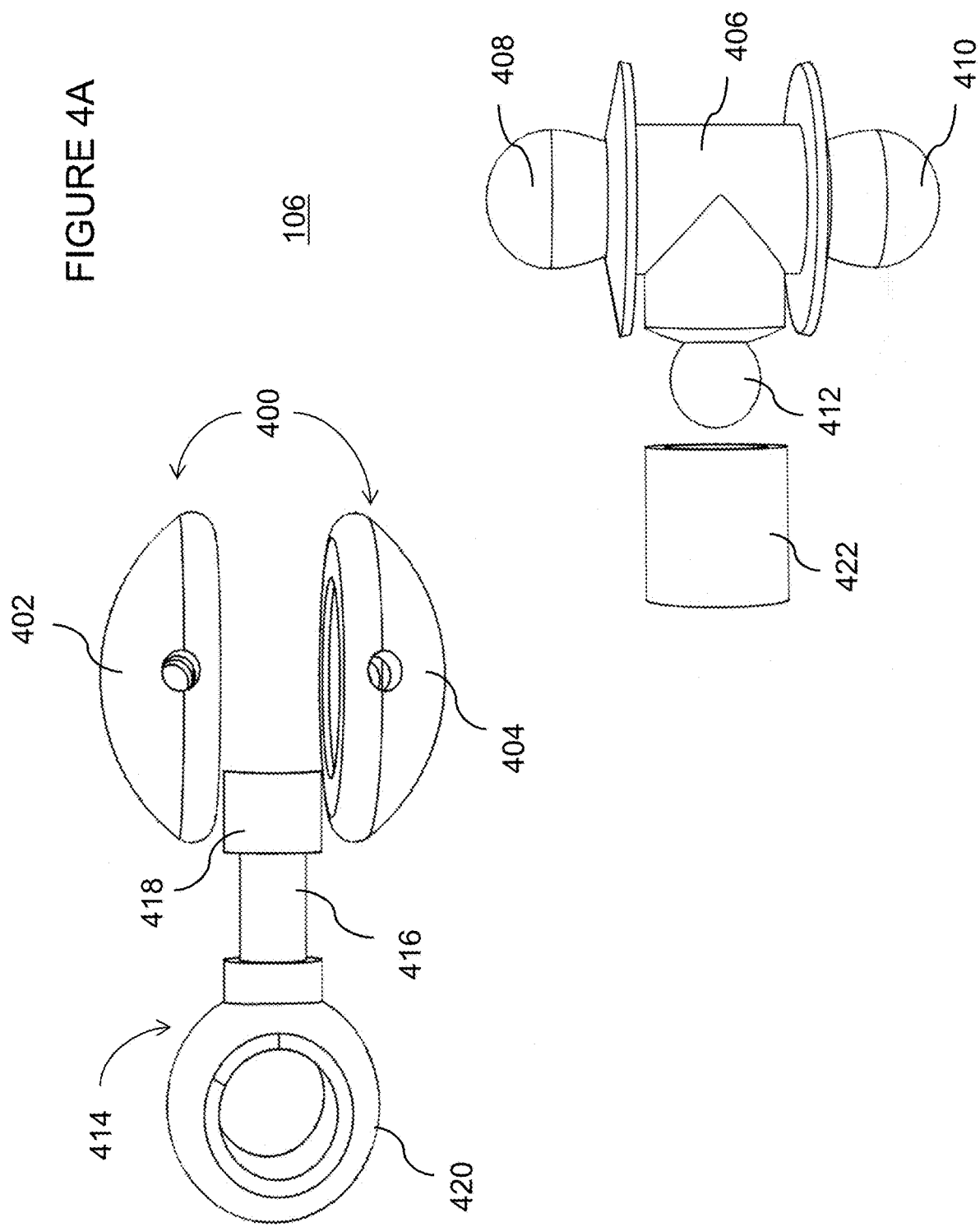
FIG. 4A illustrates an exploded side view of a ball bearing and joint of the utility belt system of FIG. 1.

Referring now to FIG. 4A, an exploded side view of a ball bearing and joint 106 of the utility belt system 100 of FIG. 1 is shown. A ball bearing 400 includes a first socket 402 and a second socket 404. A rod 406 connects a first ball 408 and a second ball 410. First ball 408 fit into first socket 402, and second ball 410 fits into socket 404. Ball bearing 400 further includes a third ball 412.

A joint 414 includes a long rod 416 connected to a spherical socket 418 on one end, and a ring 420 on the other end. Ring 420 can be secured to another other object, such as a leash or a rope, via a connecting mechanism such as, by way of example and not limitation, a carabiner or other clip. Third ball 412 fits into spherical socket 418 to connect joint 414 with ball bearing 400. Long rod 416 is encompassed by spherical sheath 422, which rotates around long rod 416 to reduce friction between the joint 414 and outer sheath 202, 204. This reduction in friction ultimately improves mobility of ball bearing and joint 106 as it moves about the belt assembly 100.

Figure 4B:
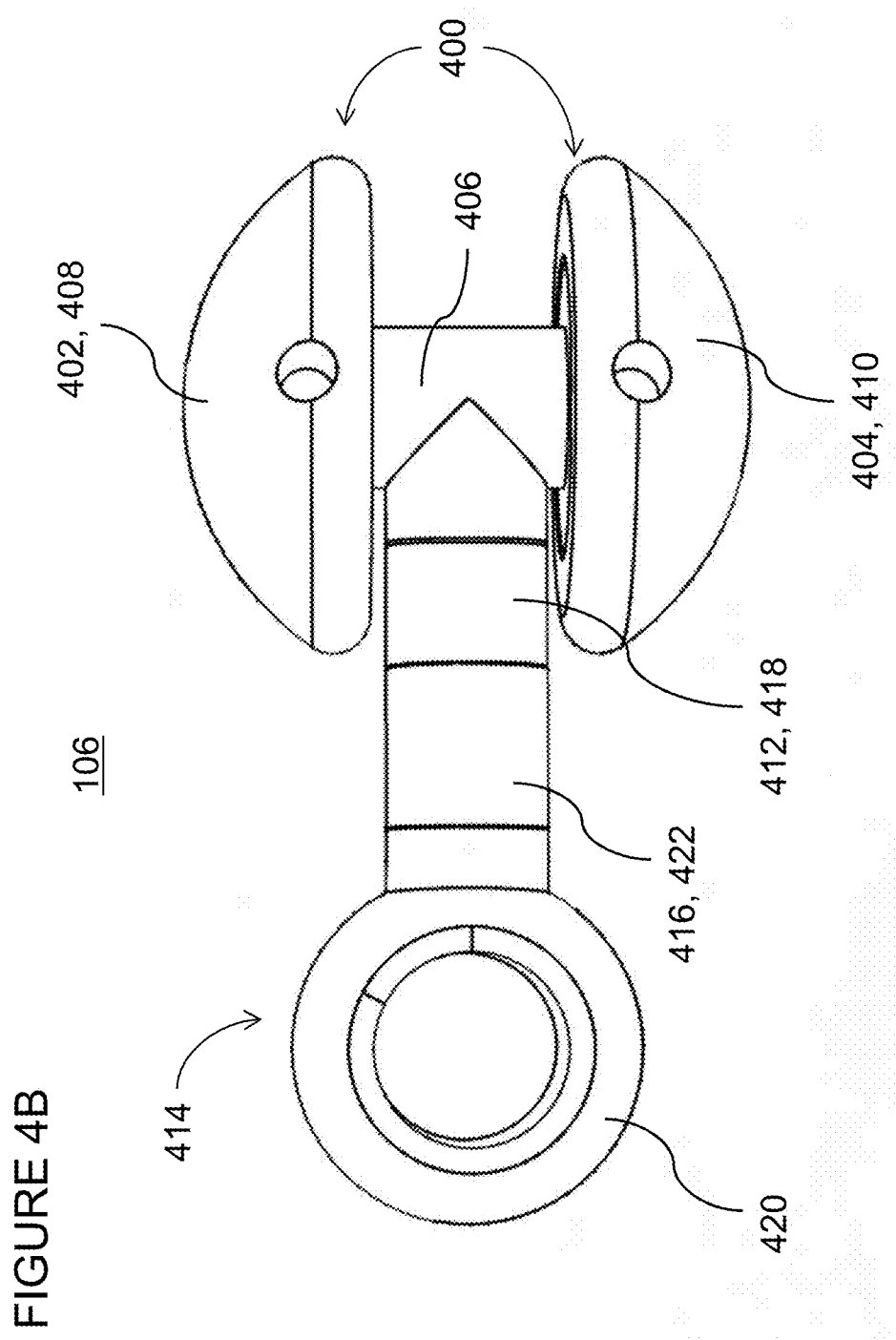
FIG. 4B illustrates a side view of a fully assembled ball bearing and joint of the utility belt system of FIG. 1.

Referring now to FIG. 4B, a side view of a fully assembled ball bearing and joint 106 of the utility belt system 100 of FIG. 1 is shown. Ball bearing 400 may be made of any suitable low-friction material. By way of example and not limitation, ball bearing 400 may be comprised of aluminum or stainless steel. Ball bearing 400 may be a universal size such that it fits any utility belt system, regardless of its size or length.

Figure 5:
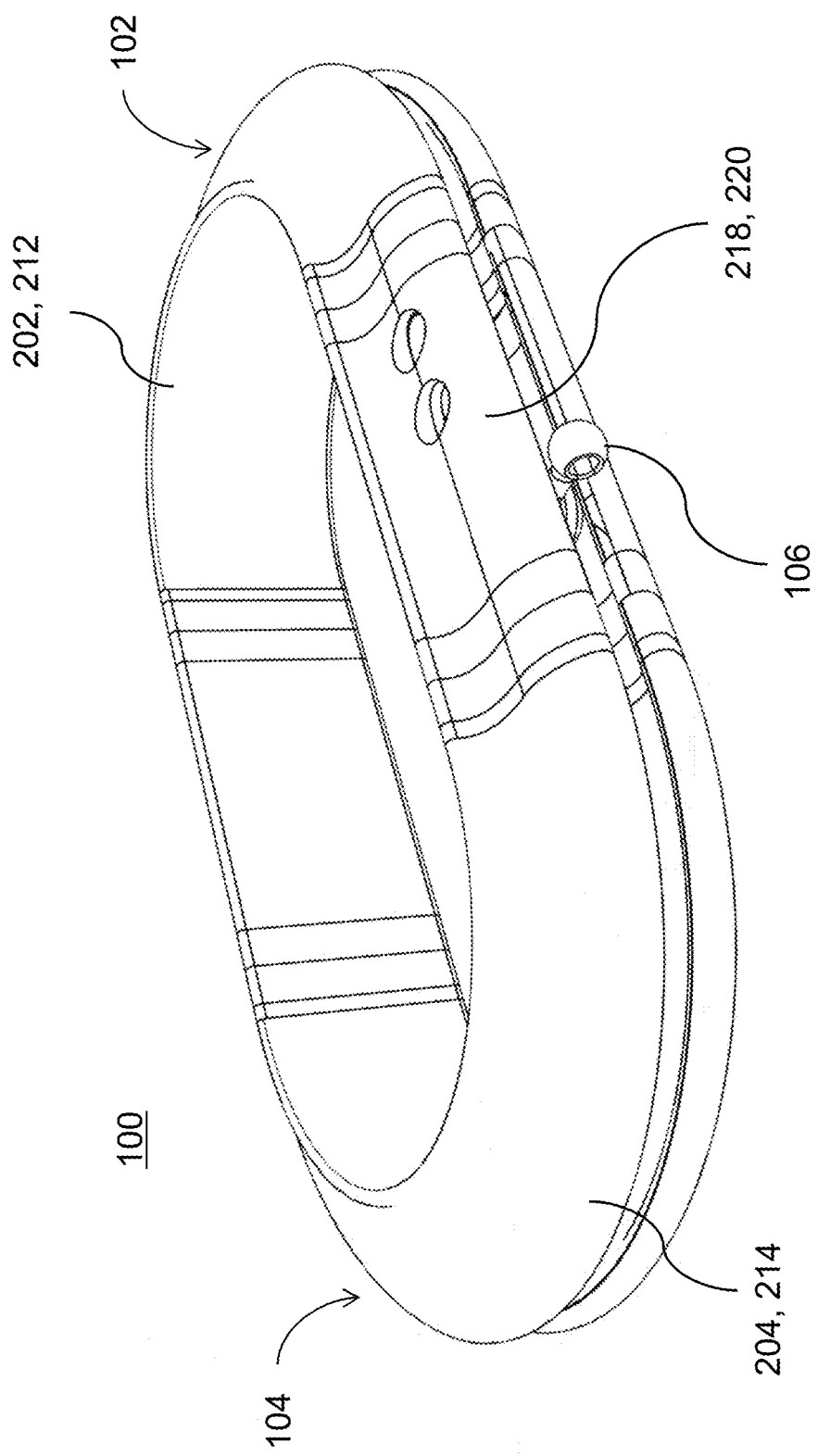
FIG. 5 illustrates a perspective view of the assembled utility belt system of FIG. 1 including the assembled ball bearing and joint of FIG. 4B.

Referring now to FIG. 5, a perspective view of the assembled utility belt system 100 of FIG. 1 including the assembled ball bearing and joint 106 of FIG. 4B is shown. Although FIG. 5 shows only a single ball bearing and joint 106, it is contemplated that a single utility belt system, such as utility belt system 100 of FIG. 1, may utilize one or more ball bearing and joint 106. The use of two or more ball bearings and joints 106 may be particularly useful in applications such as for dog walkers who require attachment of several leashes, construction workers who require the use of several tools at once, etc. Where more than one ball bearing and joint 106 is utilized on the same utility belt system 100, ball bearings 400 glide next to one another within the track of the inner C-ring tube 212, 214, and thus are not able to "jump" over one another in the track and cause tangling of lines or leashes.

Figure 7:
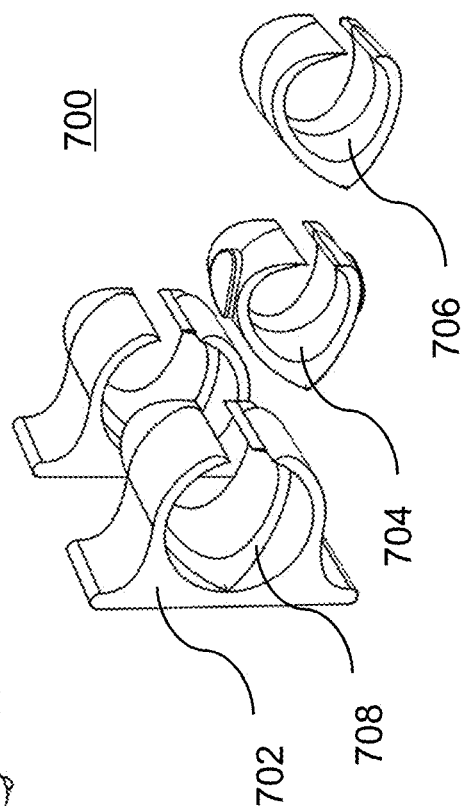
FIG. 7 illustrates a perspective view of a second extender assembly.
Figure 6:
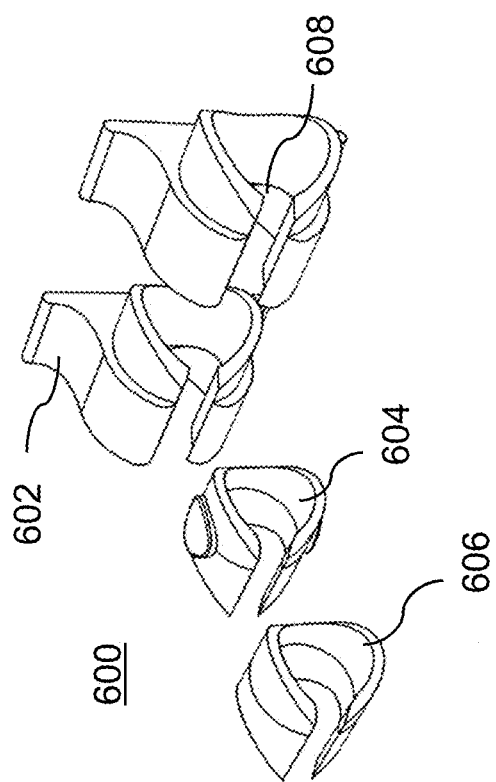
FIG. 6 illustrates a perspective view of a first extender assembly.

Referring now to FIG. 6, a perspective view of a first extender assembly is shown. A first extender assembly 600 includes a spacer 602, which may be used with male connector 604 or female connector 606 to extend the length of a utility belt and/or customize a utility belt to a specific ball bearing. Referring now to FIG. 7, a perspective view of a second extender assembly is shown. A second extender assembly 700 includes a spacer 702, which may be used with male connector 704 or female connector 706 to extend the length of a utility belt and/or customize a utility belt to specific ball bearing. Either or both of first extender assembly 600 and second extender assembly 700 may be used on a utility belt (one extender assembly per set of locking mechanisms, e.g., male locking mechanism 218 and female locking mechanism 220), depending on the amount of extension required.

As can be seen in FIGS. 6 and 7, spacers 602 and 702 each include a groove (labeled 608 and 708, respectively), which may accept the male connectors (604, 704) or the male locking mechanism (218, FIG. 2C), or which may accept the female connectors (606, 706) or the female locking mechanism (220, FIG. 2D).

It is envisioned that the use of extender assembly 600 or 700 would be optional because the utility belt assembly of the present invention may be offered in various sizes, similar to standard clothing belt sizes, for different size users. However, extender assembly 600 or 700 may be useful for extending a belt for a larger user and may be removed so that the belt may fit a smaller user, or it may be used to size a belt up or down if the user gains or loses weight, for example.

Figure 8A:
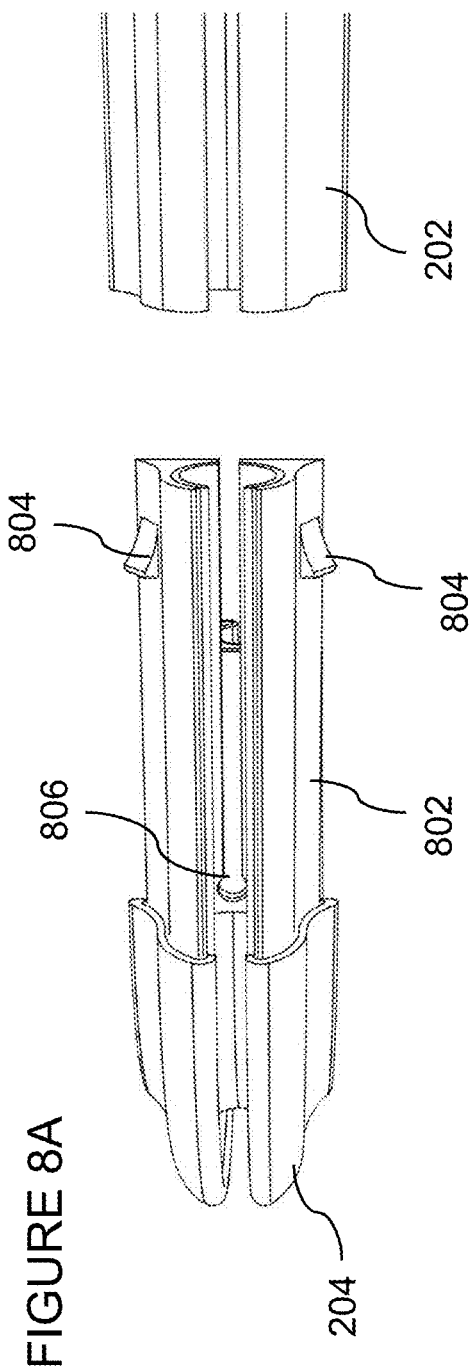
FIG. 8A illustrates a perspective view of a first alternative locking mechanism in an unlocked position.
Figure 8B:
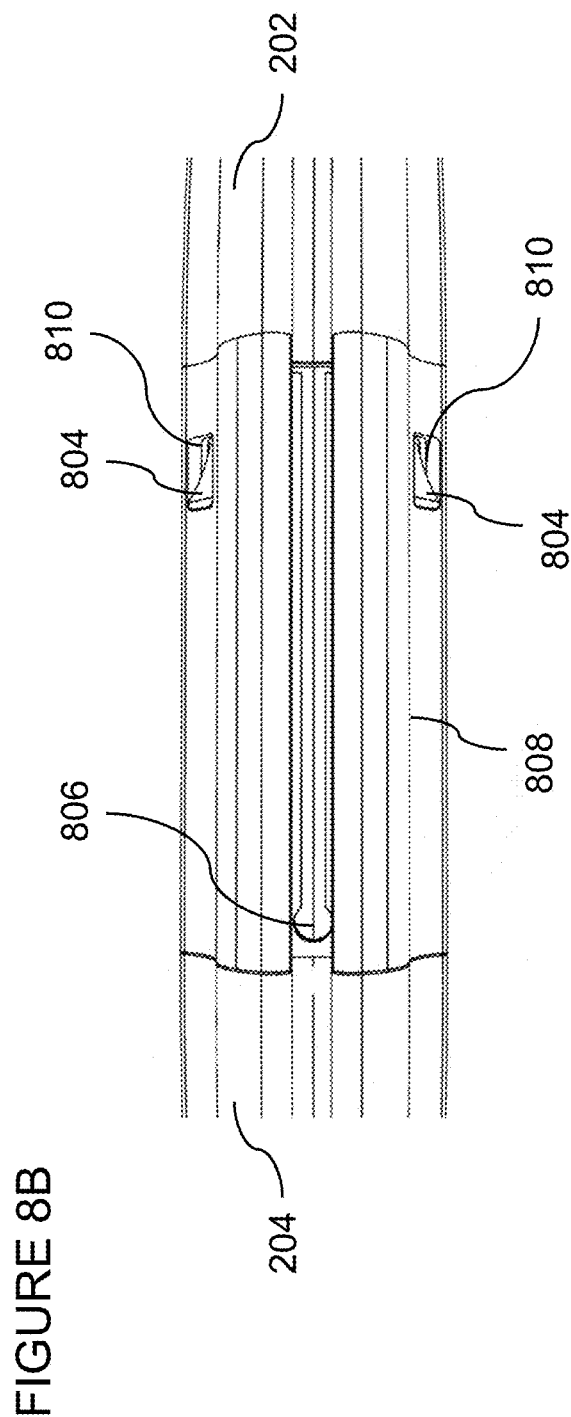
FIG. 8B illustrates a front view of the alternative locking mechanism of FIG. 8A in a locked position.

Referring now to FIG. 8A, a perspective view of a first alternative locking mechanism is shown in an unlocked position. Outer sheaths 202, 204 house inner C-ring tubes 212, 214 (not shown), one of which includes a male locking mechanism 802. Male locking mechanism 802 includes locking tabs 804 and a circular cut-out 806. Referring now to FIG. 8B, a front view of the alternative locking mechanism of FIG. 8A is shown in a locked position. Male locking mechanism 802 fits inside female locking mechanism 808, which includes apertures 810. Locking tabs 804 interface with apertures 810. The circular cut-out 806 causes male locking mechanism 802 to act as a spring. Circular cut-out 806 forces the upper and lower portions of male locking mechanism 802 in an outward direction in order to retain its circular shape, thereby locking tabs 804 through apertures 810 and securing male locking mechanism 802 to female locking mechanism 808.

Figure 9:
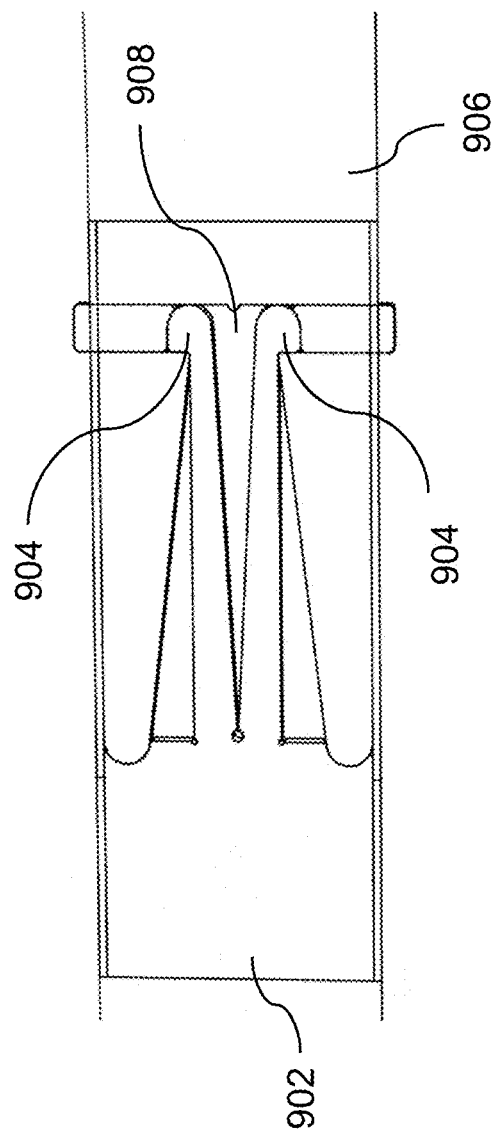
FIG. 9 illustrates a front view of a second alternative locking mechanism in a locked position.

Referring now to FIG. 9, a front view of a second alternative locking mechanism is shown in a locked position. A male locking mechanism 902 having prongs 904 connects to a female locking mechanism 906 having a T-shaped apertures 908. Prongs 904 interface with the arms of T-shaped aperture 908 to secure male locking mechanism 902 to female locking mechanism 906.

Figure 10A:
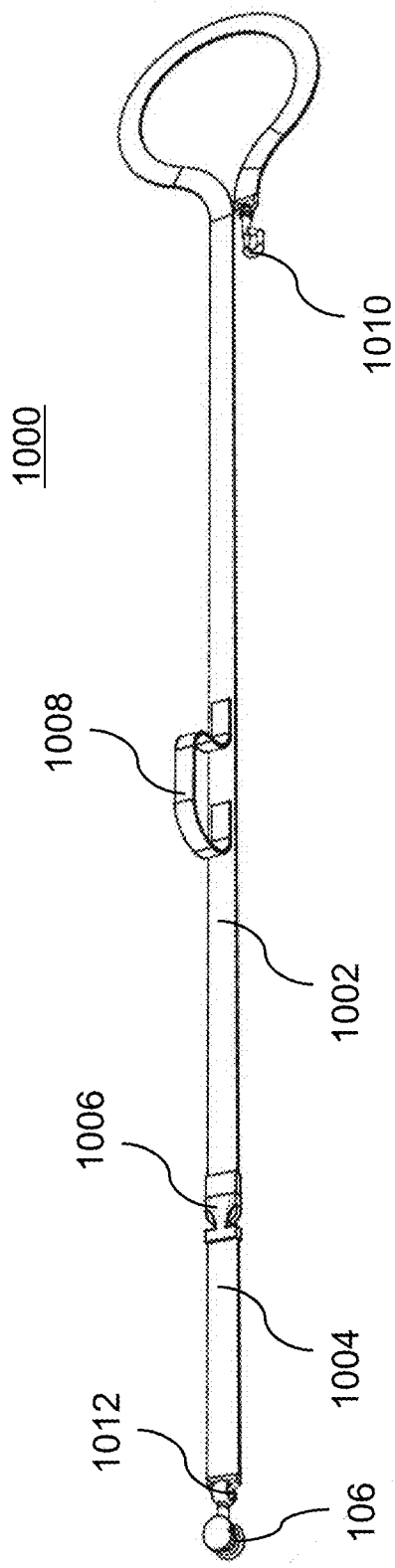
FIG. 10A illustrates a perspective view of a leash coupled to the assembled ball bearing and joint of FIG. 4B in a locked position.

Referring now to FIG. 10A, a perspective view of a leash coupled to the assembled ball bearing and joint of FIG. 4B is shown in a locked position. A leash assembly 1000 includes an upper leash portion 1002 and a lower leash portion 1004 connected by a leash locking mechanism 1006. Upper leash portion 1002 includes a handle 1008 and a leash fastener 1010. Handle 1008 allows more precise manual control of the leash by the user. Leash fastener 1010 may connect the leash to another object (e.g., a dog collar). Lower leash portion 1004 includes a ball bearing fastener 1012 that connects the leash 1000 to assembled ball bearing and joint 106 of FIG. 4B.

Figure 10B:
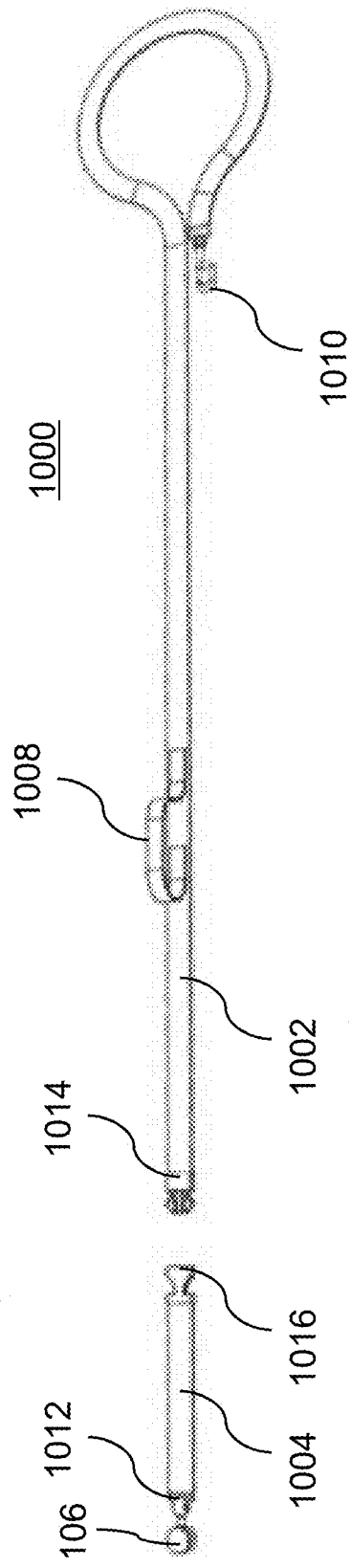
FIG. 10B illustrates a perspective view of a leash coupled to the assembled ball bearing and joint of FIG. 4B in an unlocked position.

Referring now to FIG. 10B, a perspective view of a leash coupled to the assembled ball bearing and joint of FIG. 4B is shown in an unlocked position. Leash locking mechanism 1006 includes a male locking mechanism 1014 and a female locking mechanism 1016.

Figure 10C:
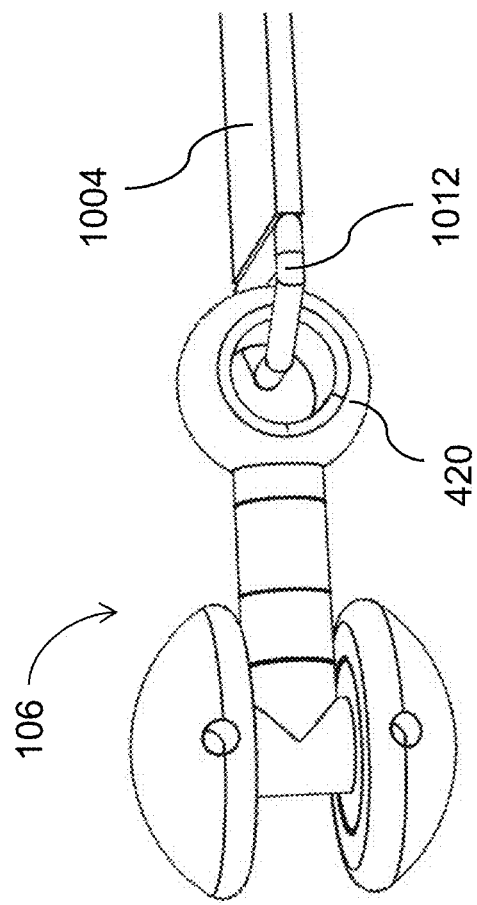
FIG. 10C illustrates a partial perspective view of a ball bearing fastener of the leash assembly of FIG. 10A coupled to the assembled ball bearing and joint of FIG. 4B.

Referring now to FIG. 10C, a partial perspective view of a ball bearing fastener of the leash assembly of FIG. 10A coupled to the assembled ball bearing and joint of FIG. 4B is shown. Lower leash portion 1004 includes ball bearing fastener 1012. Ball bearing fastener 1012 is coupled to ring 420 of ball bearing assembly 106 of FIG. 4B. Ball bearing fastener 1012 may be comprised of any suitable low-friction material, such as a metal. Once ball bearing 106 is coupled to belt assembly 100 (not shown), the leash assembly 1000 allows a user to be tethered to another object (e.g., a dog with a dog collar) hands-free.

It will be apparent to those skilled in the art that the above description provides a hands-free utility belt that confers many advantages over known utility belts. For example, the utility belt of the present invention includes an innovative track and ball bearing design, which gives provides the user with a 360-degree range of motion. This increased flexibility of movement will result in increased user satisfaction and safer performance of hands-free activities.

It will also be apparent that the utility belt of the present invention has virtually limitless applications since any object may be connected to the user wearing the belt via the ring of the ball bearing joint. By way of example and not limitation, the utility belt as disclosed herein may have applications in the following fields: pet leashes, child safety harnesses and restraints, extreme sports such as hiking and rock climbing, athletic and recreational equipment, construction equipment, and others.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claim and otherwise appreciated by one of ordinary skill in the art.

What is claimed is:

1. A utility belt comprising:
a belt track including a first belt section coupled to a second belt section by a locking mechanism; and
a ball bearing assembly that rotates about the belt track, and wherein the ball bearing assembly comprises:
a ball bearing including: a first socket and a second socket, a first rod coupling a first ball to a second ball, wherein the first ball is configured to be accepted into the first socket and the second ball is configured to be accepted into the second socket, and a third ball coupled to the first rod.

2. The utility belt of claim 1, wherein the locking mechanism comprises:
a first male locking mechanism and a first female locking mechanism of the first belt section; and
a second male locking mechanism and a second female locking mechanism of the second belt section.

3. The utility belt of claim 2, wherein the first and second male locking mechanisms each includes a top lock button and a bottom lock button.

4. The utility belt of claim 3, wherein the first and second female locking mechanism each includes a plurality of top apertures and a plurality of bottom apertures.

5. The utility belt of claim 4, wherein the first male locking mechanism connects to the second female locking mechanism when the top lock button of the first male locking mechanism protrudes through one of the plurality of top apertures of the second female locking mechanism, and the bottom lock button of the first male locking mechanism protrudes through one of the plurality of bottom apertures of the second female locking mechanism.

6. The utility belt of claim 4, wherein the second male locking mechanism connects to the first female locking mechanism when the top lock button of the second male locking mechanism protrudes through one of the plurality of top apertures of the first female locking mechanism, and the bottom lock button of the second male locking mechanism protrudes through one of the plurality of bottom apertures of the first female locking mechanism.

7. The utility belt of claim 1, wherein the first belt section and the second belt section each comprises an outer sheath and an inner tube.

8. The utility belt of claim 7, wherein the inner tube comprises a plurality of C-shaped rings.

9. The utility belt of claim 1, further comprising an extender assembly coupled to the belt track.

10. The utility belt of claim 9, wherein the extender assembly comprises at least one connector and at least one spacer.

11. A utility belt comprising:
a belt track including:
a first belt section having a first male locking mechanism and a first female locking mechanism;
a second belt section coupled to the first belt section having a second male locking mechanism and a second female locking mechanism, wherein the first male locking mechanism connects to the second female locking mechanism and the second male locking mechanism connects to the first female locking mechanism; and
a ball bearing assembly that rotates about the belt track, and wherein the ball bearing assembly comprises:
a ball bearing including: a first socket and a second socket, a first rod coupling a first ball to a second ball, wherein the first ball is configured to be accepted into the first socket and the second ball is configured to be accepted into the second socket, and a third ball coupled to the first rod.

12. The utility belt of claim 11, wherein the first and second male locking mechanisms each includes a top lock button and a bottom lock button.

13. The utility belt of claim 12, wherein the first and second female locking mechanisms each includes a plurality of top apertures and a plurality of bottom apertures.

14. The utility belt of claim 13, wherein the top lock button of the first male locking mechanism protrudes through one of the plurality of top apertures of the second female locking mechanism, and the bottom lock button of the first male locking mechanism protrudes through one of the plurality of bottom apertures of the second female locking mechanism.

15. The utility belt of claim 13, wherein the top lock button of the second male locking mechanism protrudes through one of the plurality of top apertures of the first female locking mechanism, and the bottom lock button of the second male locking mechanism protrudes through one of the plurality of bottom apertures of the first female locking mechanism.

16. The utility belt of claim 11, wherein the first belt section and the second belt section each comprises an outer sheath and an inner tube.

17. The utility belt of claim 16, wherein the inner tube comprises a plurality of C-shaped rings.

18. The utility belt of claim 11, further comprising an extender assembly coupled to the belt track.

* * * * *